(12) United States Patent
Petzold (10) Patent No.: US 8,317,654 B2
(45) Date of Patent: *Nov. 27, 2012

(54) METHOD FOR CONTROLLING AN AUTOMATED STEP-BY-STEP VARIABLE SPEED TRANSMISSION

(75) Inventor: Rainer Petzold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 485 days.

This patent is subject to a terminal disclaimer.

(21) Appl. No.: 12/670,128

(22) PCT Filed: Jul. 4, 2008

(86) PCT No.: PCT/EP2008/058677
§ 371 (c)(1),
(2), (4) Date: Jan. 22, 2010

(87) PCT Pub. No.: WO2009/015992
PCT Pub. Date: Feb. 5, 2009

(65) Prior Publication Data
US 2010/0190605 A1    Jul. 29, 2010

(30) Foreign Application Priority Data
Aug. 2, 2007 (DE) .......................... 10 2007 036 337

(51) Int. Cl.
*F16H 61/48* (2006.01)
*F16H 61/02* (2006.01)
*B60W 10/02* (2006.01)
*B60W 10/10* (2012.01)

(52) U.S. Cl. .............................. 477/53; 477/75; 477/80
(58) Field of Classification Search .................... 477/53, 477/75, 80
See application file for complete search history.

(56) References Cited

U.S. PATENT DOCUMENTS

| | | | |
|---|---|---|---|
| 6,920,383 B2 | 7/2005 | Graf et al. | |
| 7,223,204 B2 | 5/2007 | Steen et al. | |
| 2004/0157701 A1* | 8/2004 | Legner | 477/53 |
| 2008/0201047 A1 | 8/2008 | Eisele et al. | |
| 2011/0218699 A1* | 9/2011 | Petzold | 701/22 |

FOREIGN PATENT DOCUMENTS

| | | |
|---|---|---|
| DE | 197 33 465 A1 | 2/1998 |
| DE | 199 49 204 A1 | 4/2000 |
| DE | 199 26 697 A1 | 12/2000 |
| DE | 199 42 715 | 3/2001 |
| DE | 101 24 989 A1 | 12/2002 |
| DE | 102 58 834 A1 | 7/2004 |

(Continued)

*Primary Examiner* — Edwin A Young
(74) *Attorney, Agent, or Firm* — Davis & Bujold, PLLC (57) ABSTRACT

A method of controlling a multi-step transmission which is connected, via a friction clutch or by a torque converter, to a engine, and, via an axle, to wheels such that when the vehicle is stationary, the engine is running and the drivetrain is disengaged, rolling of the vehicle is prevented or restricted by a shift of the multi-step transmission. The method to prevent rolling includes the step that when the multi-step transmission is in neutral, a safety function is activated, in which actuation of a shift operation element, the accelerator and brake pedals and the current rolling speed are detected by sensors and, if the driving operation elements have not been actuated, then if a predefined rolling speed limit is exceeded, the friction clutch is disengaged if necessary, a starting gear is engaged and the friction clutch is engaged.

13 Claims, 6 Drawing Sheets

FOREIGN PATENT DOCUMENTS

| | | |
|---|---|---|
| DE | 10 2006 037 836 A1 | 3/2007 |
| DE | 10 2006 038 571 A1 | 3/2007 |
| DE | 10 2005 049 710 A1 | 4/2007 |
| EP | 09 92 386 A1 | 4/2000 |
| WO | 03/002368 A1 | 1/2003 |
| WO | 2005/084995 A1 | 9/2005 |

* cited by examiner

METHOD FOR CONTROLLING AN AUTOMATED STEP-BY-STEP VARIABLE SPEED TRANSMISSION

This application is a National Stage completion of PCT/EP2008/058677 filed Jul. 4, 2008, which claims priority from German patent application serial no. 10 2007 036 337.2 filed Aug. 2, 2007.

FIELD OF THE INVENTION

The invention concerns a method for controlling an automated multi-step variable-speed transmission which, within a drivetrain of motor vehicle, is connected on the input side by means of at least one controllable friction clutch or a hydrodynamic torque converter to a drive unit in the form of an internal combustion engine, and on the output side by means of an axle drive to driven wheels of a drive axle, such that when the vehicle is at rest, the drive engine is running and the drivetrain is disengage, rolling of the motor vehicle is prevented or at least restricted by a shift operation of the multi-step variable-speed transmission.

BACKGROUND OF THE INVENTION

An automated multi-step variable-speed transmission of the type mentioned above is understood to be an automated variable-speed transmission, an automated dual-clutch transmission or a planetary automatic transmission. The term automated multi-step variable-speed transmission also covers an automatic transmission whose transmission ratio as such can be varied continuously, but in which change-over gearing enables the rotation direction of the transmission output shaft to be reversed and in which, by appropriate control of transmission ratio changing means, shifting between transmission ratio steps firmly predetermined by programming means is also possible.

An automated variable-speed transmission of countershaft design usually has its input shaft connected to the drive engine via a single controllable friction clutch, i.e. one that can be engaged and disengaged automatically, such as a passively engaging single or multiple disk dry clutch or an actively engaging disk clutch, such that the friction clutch fulfills the functions both of a starting element and of a shifting clutch. In the case of an automated dual-clutch transmission consisting of two part-transmissions, each with an input shaft, the two input shafts can each be connected by a respective controllable friction clutch to the drive engine. In contrast, a planetary automatic transmission is usually connected with its input shaft to the drive engine by a hydrodynamic torque converter that forms a starting element. However, other combinations of multi-step variable-speed transmissions and starting elements are also possible, for example a combination comprising an automated variable-speed transmission with an upstream hydrodynamic torque converter, or one comprising a planetary automatic transmission with an upstream friction clutch.

In a motor vehicle whose drivetrain comprises such a combination of a multi-step variable-speed transmission and a starting element, when the drive engine is running and the drivetrain is disengaged, i.e. when the multi-step variable-speed transmission is in its neutral position and/or the starting element is disengaged, there is, in general, a risk that without the driver wanting this the motor vehicle may begin rolling because a gear is engaged or because it is on a gradient, which can lead to dangerous situations both for the vehicle's occupants and for other, nearby traffic.

For example, it is possible for a motor vehicle equipped with an automated multi-step variable-speed transmission and a passively engaging friction clutch, when the drive engine is running, the friction clutch is disengaging and a gear is engaged, to start off autonomously, if a defect develops in the clutch control system as a result of which the friction clutch engages unintentionally. To avoid this, for example in DE 199 26 697 A1 a device and method are proposed by virtue of which, when the motor vehicle is stationary, the drive engine is running, the friction clutch is disengaged and a gear is engaged, the multi-step variable-speed transmission is shifted to its neutral position, i.e. the engaged gear is disengaged, when it is detected that the motor vehicle has been in a condition in which it is not ready to drive for a predetermined period of time.

In a similar method described in DE 102 58 834 A1, in the case of a drivetrain designed in principle in the same way it is provided that when the motor vehicle is at rest, the drive engine is running, the friction clutch is disengaged and a gear is engaged, the multi-step variable-speed transmission is shifted to neutral if it is detected that one of the vehicle's doors has remained open for a predetermined time. In this way undesired starting of the motor vehicle can be avoided, which might result either from a defect in the clutch control system or due to inadvertent actuation of a driving operation element, in particular the accelerator pedal, that causes the friction clutch to engage.

However, undesired rolling of the motor vehicle due to an uphill or downhill road gradient cannot be prevented in this way. Thus, when the drivetrain is disengaged the driver must engage a parking brake or pull it up hard enough to keep the motor vehicle safely immobile. But if the parking brake has not been engaged or not pulled up hard enough, for example because the driver has underestimated the gradient and has therefore not engaged the parking brake or not pulled it up hard enough, or because the driver or some other occupant of the vehicle has inadvertently released the parking brake, then the motor vehicle can roll downhill uncontrolled. It is true that if the driver in such a situation is in his seat and notices the rolling, he can stop the uncontrolled rolling by actuating the service brakes or by engaging a gear by actuating a shift operation element and sometimes by actuating the accelerator pedal. But for this, the driver must be present in his seat and must react quickly, which is not always certain.

SUMMARY OF THE INVENTION

Against this background the purpose of the present invention is to indicate a method for controlling an automated multi-step variable-speed transmission of the type mentioned at the beginning, by means of which, to increase traffic safety, uncontrolled rolling of the motor vehicle under the conditions described above can be prevented or at least restricted in a simple manner and in particular without additional equipment cost.

In the case of a multi-step variable-speed transmission connected on its input side by at least one friction clutch to the drive engine, this objective is achieved in that when the multi-step variable-speed transmission is in its neutral position a safety function is activated, in which actuation of a shift operation element, the accelerator pedal and the brake pedal, and the current rolling speed are determined by sensor means, and in which, if the driving operation elements (shift operation element, accelerator pedal, brake pedal) are not actuated and a predetermined speed limit is exceeded, the friction clutch is disengaged as necessary, a starting gear is engaged, and the friction clutch is engaged.

In the case of a multi-step variable-speed transmission connected to the drive engine on its input side by a hydrodynamic torque converter, the objective is achieved in that when the multi-step variable-speed transmission is in its neutral position a safety function is actuated, in which actuation of a shift operation element, the accelerator pedal and the brake pedal, and the current rolling speed are determined by sensor means, and in which, if the driving operation elements (shift operation element, accelerator pedal, brake pedal) are not actuated and a predetermined speed limit is exceeded, a starting gear is engaged.

Advantageous and expedient design features and further developments of the method according to the invention are the object of the subordinate claims, in which, since there are two different principal claims relating to the structure of the starting element, attention should be paid to the back-references.

Accordingly, the invention starts from a motor vehicle with an automated multi-step variable-speed transmission which, within a drivetrain of the motor vehicle, is connected on its input side by at least one controllable friction clutch or a hydrodynamic torque converter to a drive unit in the form of an internal combustion engine and on its output side by an axle drive to drive wheels of a driven axle. According to the invention, when the vehicle is at rest, the drive engine is running and the drivetrain is disengaged at least because the multi-step variable-speed transmission is shifted to its neutral position, rolling of the motor vehicle is prevented or at least restricted by disengaging the starting element as necessary, engaging a starting gear and engaging the starting element as necessary, all automatically, i.e. without any action on the part of the driver, whereby a substantial increase in the traffic safety of the motor vehicle is achieved. During this it is not necessary to disengage the starting element when the latter is in the form of an actively engaging friction clutch such as a disk clutch, or a hydrodynamic torque converter. In contrast, engagement of the starting element is only unnecessary when it is a hydrodynamic torque converter.

By engaging the starting gear and if necessary engaging the starting element, the drivetrain is engaged and thus uncontrolled rolling of the motor vehicle is prevented by the braking action of the drive engine in its neutral position. In modern motor vehicles fitted in any case with the corresponding sensor systems the method according to the invention can be implemented simply and with no additional equipment cost. Thus, besides sensors for detecting the actuation of a shift operation element such as a drive switch or a selector lever, the accelerator pedal and the brake pedal, only wheel speed sensors or a rotation speed sensor on the output shaft of the multi-step variable-speed transmission for determining the current rolling speed, which are in any case present in modern motor vehicles, are needed for implementing the method.

Regardless of the direction of the rolling a staring gear for forward driving that is appropriate for the speed limit can be used as the starting gear to be engaged. If the motor vehicle is rolling forward, then when the forward gear is engaged the drive engine operates in the thrust mode so that the rolling of the motor vehicle is braked by the drag torque of the engine. Whether the motor vehicle then decelerates or accelerates again depends on the relation between the drag torque and the gradient-related propelling force. In contrast, when the motor vehicle is rolling backward, if the gradient-related propelling force is small enough the idling torque of the drive engine can cause the rolling direction of the motor vehicle to be reversed. On the other hand, a larger gradient-related propelling force can result in stalling of the engine unless this is prevented by appropriate measures, and further rolling away of the motor vehicle is then prevented because the engine is static.

Alternatively however, it is also possible to detect the current rolling direction by means of sensors and to engage a starting gear that is effective in the rolling direction concerned and is appropriate for the speed limit. In this way, on the one hand stalling of the drive engine, which is generally undesirable from the standpoint of component loading, is avoided and if necessary starting in the rolling direction is facilitated, which can be initiated by the driver for example by appropriate actuation of a drive switch or selector lever and/or of the accelerator pedal.

If the starting element is in the form of a friction clutch, then during a deceleration of the motor vehicle that follows the engagement of the drivetrain, i.e. during a decrease of the rolling speed, it is expedient and preferable to disengage the friction clutch again when the rolling speed falls below a predetermined value or the rotation speed of the drive engine falls below a predetermined value. This avoids stalling the engine so that the drive engine remains ready to operate and any additional functions that depend on it, some of them relevant to safety, are maintained. If the driver does not react promptly, the rolling and braking by engagement of the starting gear can be repeated several times, so producing a kind of saw-tooth profile of the rolling speed which attracts the attention of a previously inactive vehicle occupant and causes him finally to take action.

In the disengaged condition of the friction clutch the starting gear can remain engaged, at least temporarily. However, to maintain functionally disengaged readiness of the drivetrain for operation and especially in the case of a passively engaging friction clutch, in order to avoid defect-induced rolling it is advantageous, once the friction clutch has been disengaged, for the starting clutch to be disengaged at the latest when the vehicle becomes stationary.

On the other hand, if the starting element is a hydrodynamic torque converter, then during a deceleration of the motor vehicle after the drivetrain has engaged it is expedient, if the speed falls below the predetermined minimum rolling speed value or the engine speed falls below its predetermined minimum value, to disengage only the starting gear engaged. During an acceleration of the motor vehicle after engaging the drivetrain, i.e. if its rolling speed increases further, then in order to avoid racing of the drive engine an upshift by one gear can be carried out if a predetermined maximum rolling speed or a predetermined maximum drive engine speed is reached or exceeded. Although this reduces the braking force of the drive engine acting on the wheels of the driven axle, damage or destruction of the engine are avoided.

In the context of the invention it is of course understood that the upshift process is carried out in accordance with the structural type of the multi-step variable-speed transmission and that of the starting element, i.e. in the case of an automated variable-speed transmission the friction clutch is disengaged before the gearshift and engaged after it, whereas with an automated dual-clutch transmission the higher gear is first engaged in the other part-transmission, then, with a time overlap, the friction clutch of the part-transmission associated with the engaged starting gear is disengaged and the friction clutch of the part-transmission associated with the higher gear is engaged, and finally the starting gear is disengaged.

To avoid an upshift, however, if there is a further acceleration of the motor vehicle after the drivetrain has been closed, it can also be provided that if a predetermined maximum rolling speed or a predetermined maximum engine speed is reached or exceeded, a vehicle brake such as the service brake or the parking brake is actuated automatically. However, for automatic actuation of the vehicle brake additional external force means such as a brake pressure pump, a brake pressure control valve or a brake control motor are needed.

The braking torque of the vehicle brake can be regulated in such manner that the rolling speed of the motor vehicle is kept constant, or the rolling speed of the motor vehicle decreases until the vehicle is at rest.

If at least one drive operation element such as a selector lever, a drive switch, the accelerator pedal or the brake pedal is actuated while the safety function is active, the safety function ends and the vehicle returns to the normal starting or driving mode.

If the starting element is a friction clutch it can additionally be provided that before the safety function is terminated at least when a shift operation element and/or the brake pedal is actuated, the friction clutch is disengaged. Since the actuation of a shift element such as a drive switch or a selector lever and the brake pedal leads to the expectation that a subsequent gearshift will take place in the starting or driving mode, the early disengagement of the friction clutch enables this to take place more quickly. In contrast, if the accelerator pedal is actuated, subsequent continuation of the driving in the gear engaged is possible, and in such a case it is expedient for the friction clutch to remain engaged at first.

BRIEF DESCRIPTION OF THE DRAWINGS

To clarify the invention the description of a drawing is attached, which shows.

DETAILED DESCRIPTION OF THE PREFERRED EMBODIMENTS

Figure 1A:
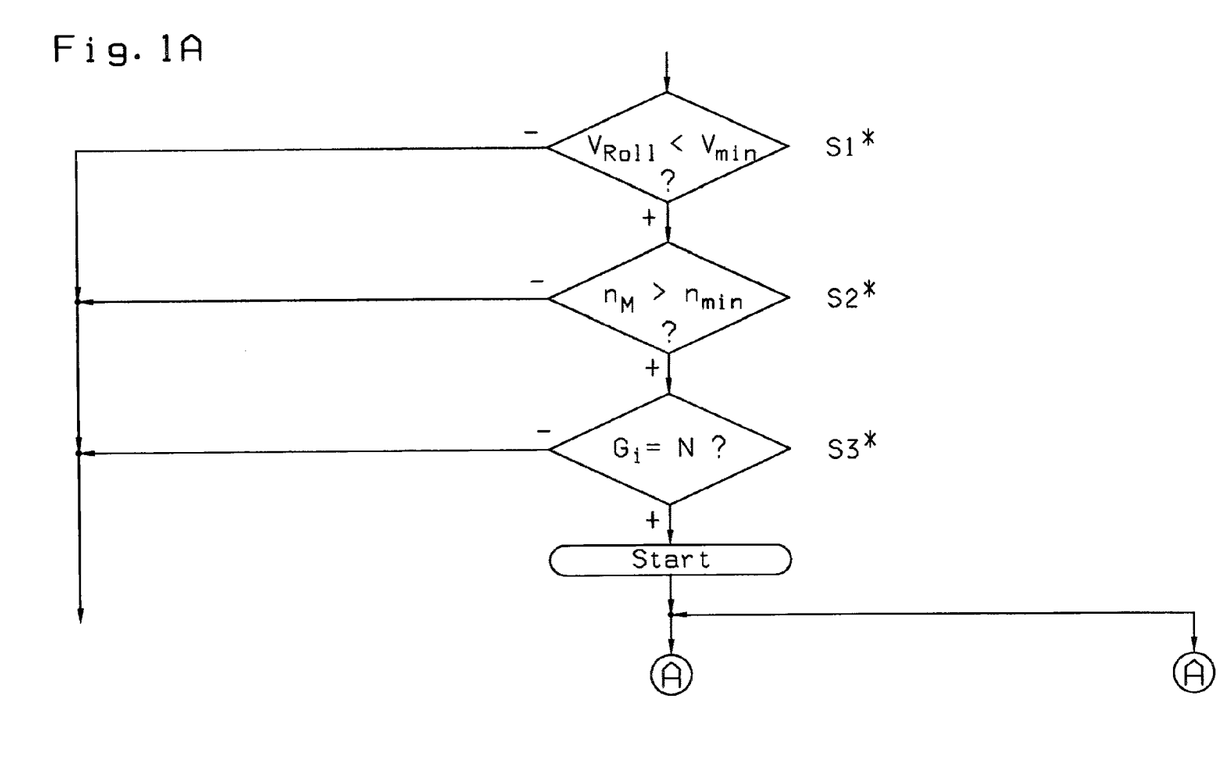
FIGS. 1A-1C are a flow chart, divided into three parts, of a preferred variant of the process according to the invention for a drivetrain with an automated variable-speed transmission and a starting element in the form of a friction clutch.
Figure 1B:
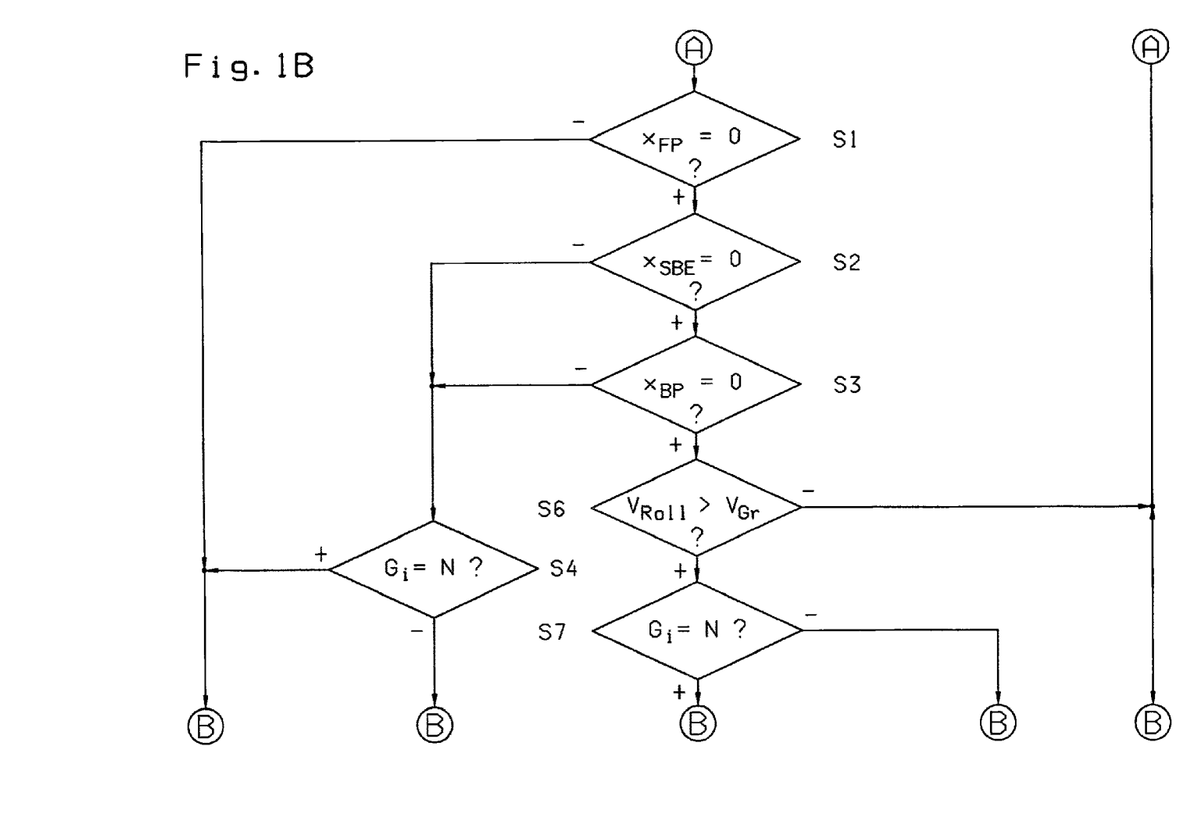
Figure 1C:
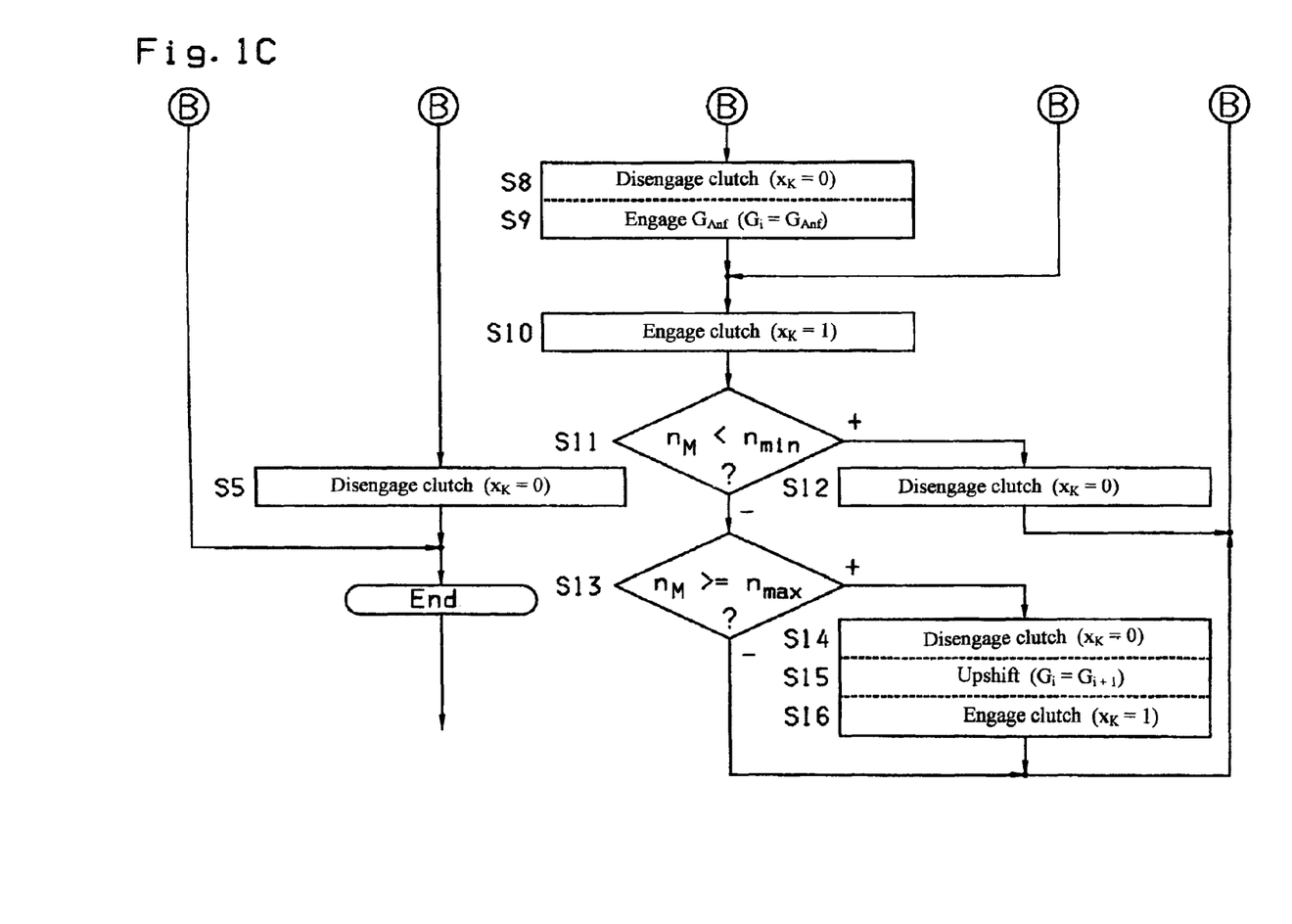

According to the three-part flow chart shown in FIGS. 1A-1C, which applies in the case of a drivetrain with an automated variable-speed transmission in the form of a multi-step variable-speed transmission and a starting element in the form of a passively engaging friction clutch, as shown in FIG. 1A it is checked in steps S1* to S3* within a normal starting or driving mode whether the vehicle is at rest, i.e. the rolling speed $v_{Roll}$ detected by wheel speed sensors or by a speed sensor arranged on the output shaft of the multi-step variable-speed transmission is lower than a specified minimum speed $v_{min}$, whether the drive engine is running, i.e. the engine speed $n_M$ indicated by the engine control system or detected by a speed sensor arranged on the crankshaft is higher than a specified minimum speed $n_{min}$, and whether no gear is engaged in the multi-step variable-speed transmission, i.e. the currently engaged gear $G_i$ corresponds to the neutral gear or neutral position N of the transmission.

If any one of those three conditions is not fulfilled, the current starting or driving mode continues unchanged. But if all three conditions are fulfilled, i.e. if the vehicle is at rest, the drive engine is running and the drivetrain is disengaged because the multi-step variable-speed transmission is in its neutral position, then according to the invention a safety function is started which serves to avoid or restrict undesired rolling of the motor vehicle.

Continuing the flow chart of FIG. 1A, in FIG. 1B it is checked in step S1 within the safety function whether the accelerator pedal has been actuated, i.e. moved away from its rest position $x_{FP}=0$. If actuation of the accelerator pedal is sensed the safety function is immediately terminated and the normal starting or driving mode is restored.

Otherwise, in the next step S2 it is checked whether a shift operation element such as a drive switch or selector lever has been actuated, i.e. moved away from its neutral position $X_{SBE}=0$. If actuation of the shift operation element is sensed, then the friction clutch is disengaged in step S5 if necessary, i.e. if a gear is engaged, which is checked in step S4, and the safety function is then terminated, with reversion to the normal starting or driving mode (see FIG. 1C).

Otherwise, in step S3 which follows S2 it is checked whether the brake pedal has been actuated, i.e. is moving or has moved away from its rest position $x_{BP}=0$. If actuation of the brake pedal is sensed, then as before the safety function is terminated, if necessary after disengaging the friction clutch, with reversion to the normal starting or driving mode. (see FIG. 1C).

Otherwise, in step S3 which follows S2 it is checked whether the brake pedal has been actuated, i.e. is moving or has moved away from its rest position $x_{BP}=0$. If actuation of the brake pedal is sensed, then as before the safety function is terminated, if necessary after disengaging the friction clutch, with reversion to the normal starting or driving mode.

Thus, actuation of a shift operation element, the accelerator pedal or the brake pedal, is interpreted to mean that the driver is in the driving seat and that the motor vehicle is under the driver's control, so that no rolling of the motor vehicle unnoticed and undesired by the driver can take place, or that it can be prevented by an appropriate driver reaction.

But if none of the driving operation elements is actuated, then in step S6 it is checked whether the vehicle is rolling autonomously, i.e. the rolling speed $v_{Roll}$ is higher than a specified speed limit $v_{G2}$. If not, i.e. if the rolling speed $v_{Roll}$ is still close or equal to zero, the system branches back to before step S1 (see FIG. 1A). Otherwise, in step S7 it is first checked whether the multi-step variable-speed transmission is still in its neutral position ($G_i=N$), which is certainly the case the first time that the function loop is run through but, after a repeat run of the function loop, is not necessarily so because a gear may have been engaged.

Continuing the sequence of FIG. 1B, in FIG. 1C when the multi-step variable-speed transmission is in its neutral position ($G_i=N$), in the following steps S8 to S10 the friction clutch is disengaged ($x_K=0$), a starting gear $G_{Anf}$ appropriate for the speed limit $v_{Gr}$ and if necessary also for the rolling direction is engaged ($G_i=G_{Anf}$), and the friction clutch is engaged again ($x_K=1$), whereas in contrast, if a gear is engaged ($G_i \neq N$) only the friction clutch, which is necessarily disengaged in this condition, is engaged in S10. When the starting gear is engaged, by virtue of the engagement of the friction clutch the rolling motor vehicle is braked by the action of the drag torque of the idling drive engine so that the risk arising from uncontrolled rolling is substantially reduced.

Then, in step S11 it is checked whether there is a risk that the drive engine may stall, i.e. whether the engine speed $n_m$ is lower a specified minimum speed $n_{min}$. That situation occurs when the starting gear engaged is active in the rolling direction and the drive engine drag torque that acts on the wheels of the driven axle is larger than the gradient-related driving force, so that the motor vehicle is braked as desired. However, the situation can also arise when the starting gear engaged is active in the direction opposite to the rolling direction and the gradient-related driving force is larger than the traction force of the drive engine acting on the wheels of the driven axle, so that although rolling is braked, the rolling direction cannot be reversed. In both cases there is a risk that the drive engine will stall, which is undesirable from the loading standpoint. To prevent that, in this case the friction clutch is disengaged in step S12 and the system then branches back to before step S1 (see FIG. 1A).

Otherwise, in step S13 it is checked whether there is a risk of engine racing, namely whether the engine speed $n_M$ is higher than or equal to a predetermined maximum speed $n_{max}$. This situation occurs when the starting gear engaged acts in the rolling direction and the drag torque of the drive engine transmitted to the wheels of the driven axle is smaller than the gradient-related drive force, so that the motor vehicle, although also braked, accelerates further downhill. In such a case to prevent racing of the drive engine and the associated damage or destruction thereof, in steps S14 to S16 the friction clutch is disengaged, a one-gear upshift is carried out and the friction clutch is re-engaged, before the system branches back to step S1. Otherwise, the system branches back to step S1 directly (see FIG. 1A).

So long as no actuation of a shift operation element such as a drive switch or a selector lever has taken place and is sensed, steps S1 to S16 are run through repeatedly and, depending on the rolling speed and the previous control sequences, the conditions "neutral position engaged" ($G_i$=N) or "gear engaged" ($G_i \neq N$) of the multi-step variable-speed transmission and the conditions "disengaged" ($x_K$=0) or "engaged" ($x_K$=1) of the friction clutch can exist.

Figure 2A:
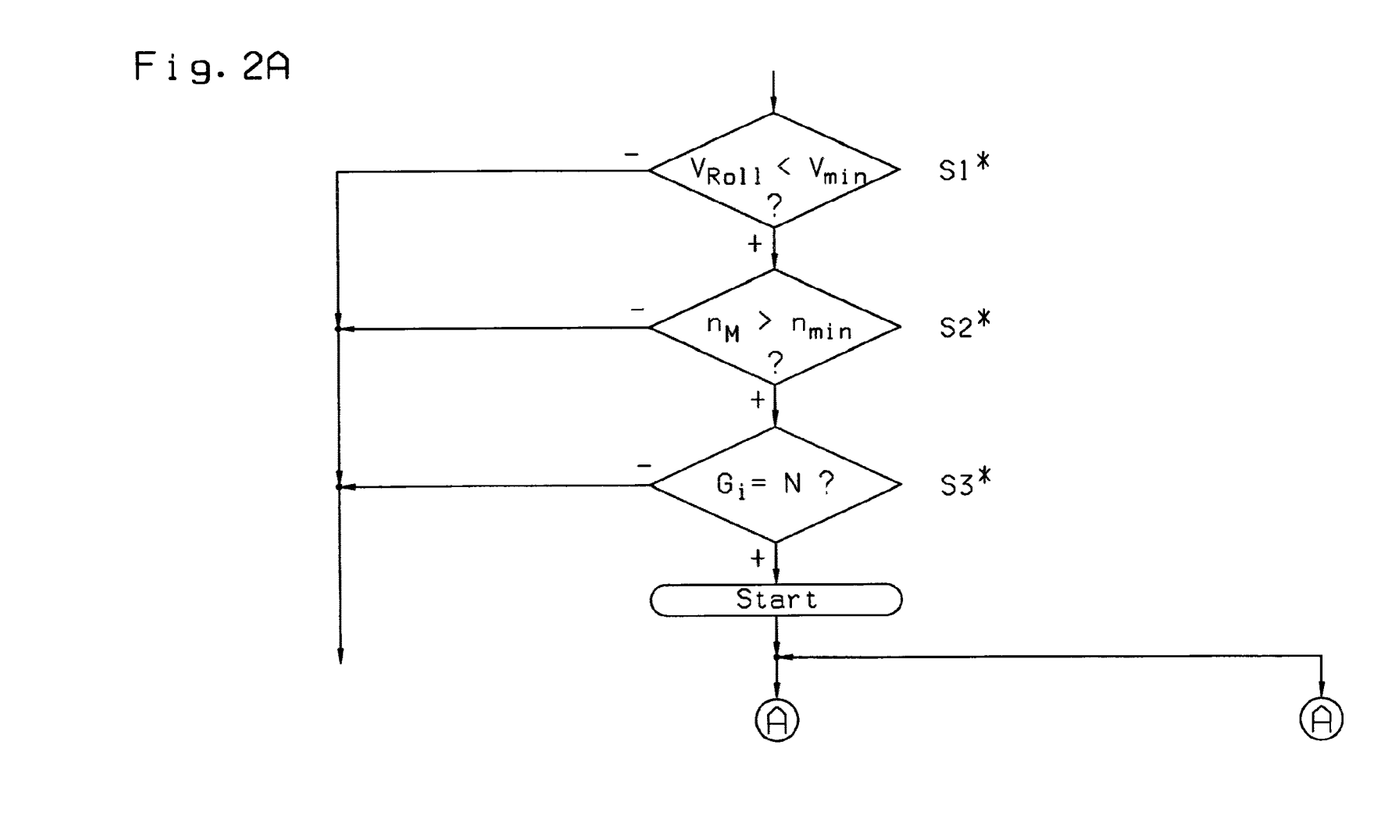
FIGS. 2A-2C are a flow chart, divided into three parts, of a preferred variant of the process according to the invention for a drivetrain with a planetary automatic transmission and a starting element in the form of a hydrodynamic torque converter.
Figure 2B:
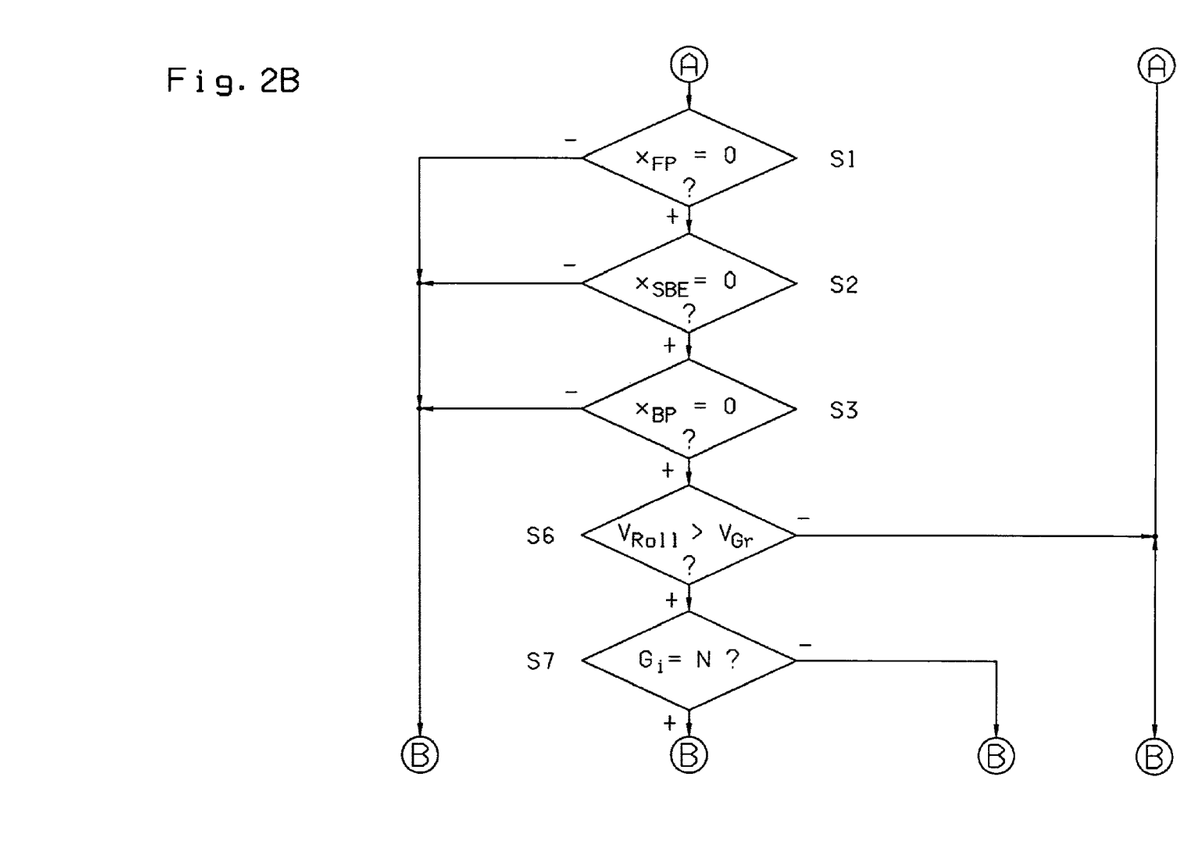
Figure 2C:
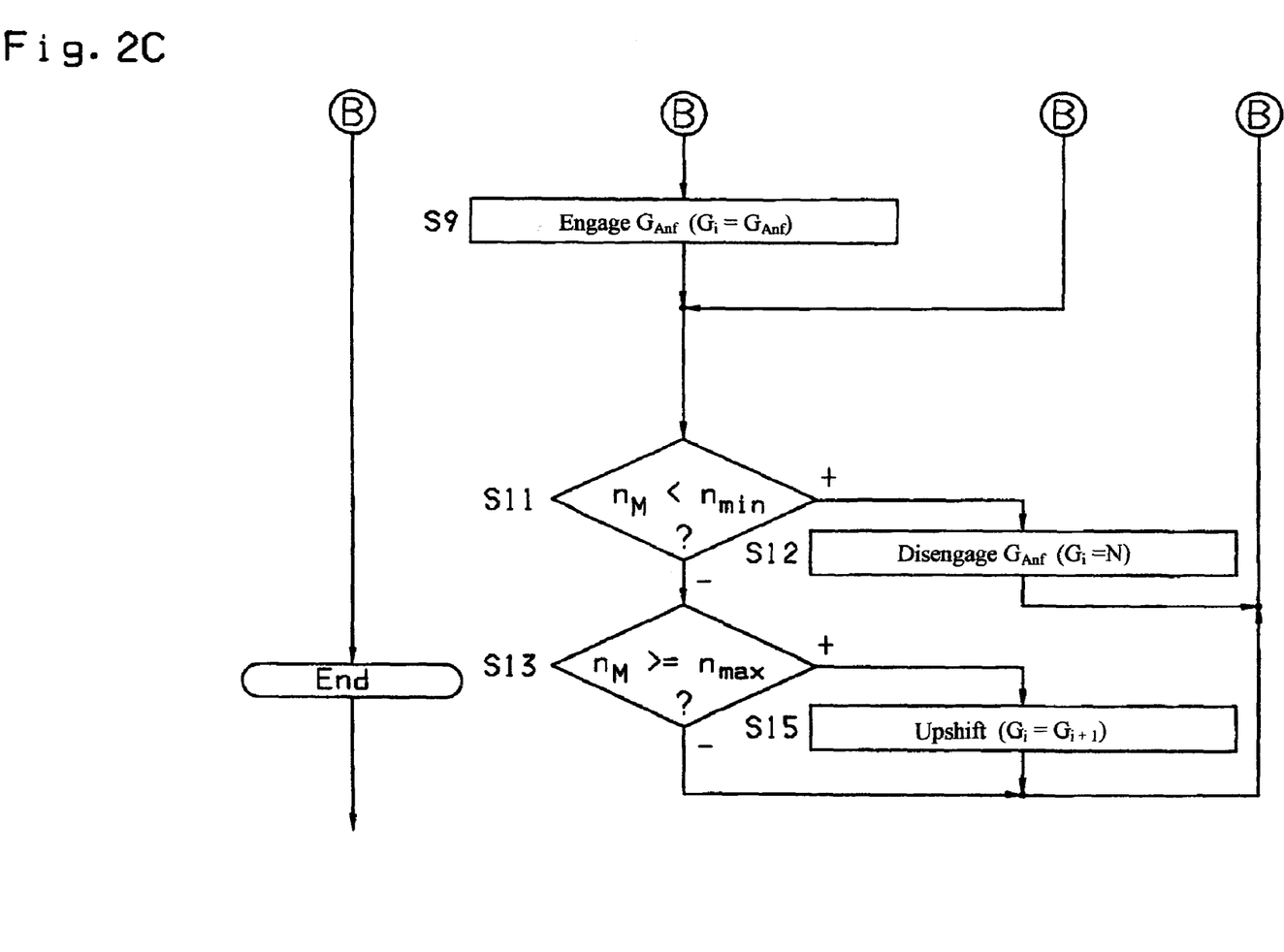

A method variant in accordance with the three-part flow chart of FIGS. 2A-2C, which applies to a drivetrain with a multi-step variable-speed transmission made as a planetary automatic transmission and a starting element in the form of a hydrodynamic torque converter, differs from the method variant described above only by virtue of the types of structure involved. Thus, owing to the torque converter the steps S4 in FIG. 2B and S5 in FIG. 2C that precede the discontinuation of the safety function and the steps S8 and S10 respectively preceding and following the engagement of the starting gear in step S9 of FIG. 2C, are omitted. Instead of the disengagement of the friction clutch, in step S12 the starting gear is disengaged because of the structure concerned, and the steps S14 and S16 respectively preceding and following the upshift in step S15 are omitted.

Thanks to the safety function according to the invention, even though a motor vehicle rolling downhill may not be kept fixed in its position, the rolling is slowed down sufficiently for the driver, even if he has temporarily left his driving seat, to react well in time. Accordingly, compared with uncontrolled rolling the danger due to rolling is greatly reduced. Furthermore, the method does not entail any additional equipment costs, but rather, relies on components that are present in any case, such as rotation speed sensors, shift control and clutch control elements.

INDEXES $G_{Anf}$ Starting gear
$G_i$ Gear engaged
$G_{i+1}$ Next-higher gear
N Neutral gear, neutral position of the transmission
$n_M$ Engine speed
$n_{max}$ Maximum engine speed
$n_{min}$ Minimum engine speed
S1-S16 Process steps
S1*-S3* Process steps
$v_{Gr}$ Speed limit
$v_{max}$ Maximum vehicle speed
$v_{min}$ Minimum vehicle speed
$v_{Roll}$ Rolling speed
$x_{BP}$ Brake pedal movement
$x_{FP}$ Accelerator pedal movement
$x_K$ Disengagement rate of a friction clutch
$x_{SBE}$ Movement of a shift operation element

The invention claimed is:

1. A method for controlling an automated multi-step variable-speed transmission which, within a drivetrain of a motor vehicle, is connected to a drive engine, on an input side via at least one controllable friction clutch, and to wheels of a driven axle, on an output side axle via an axle drive, such that when the vehicle is at rest, the drive engine is running and the drivetrain is disengaged, rolling of the motor vehicle is either prevented or at least restricted by a shift operation in the multi-step variable-speed transmission, the method comprising the steps of:

activating a safety function, when the multi-step variable-speed transmission is in a neutral position ($G_i$=N);

detecting, with sensors, actuation of a shift operation element, an accelerator pedal and a brake pedal and a current rolling speed; and disengaging the friction clutch ($x_K$=0), engaging a starting gear ($G_i$=$G_{Anf}$) and engaging the friction clutch ($x_K$=1) when the shift operation element, the accelerator pedal and the brake pedal are not actuated (shift operation element $x_{SBE}$=0, accelerator pedal $x_{FP}$=0, brake pedal $x_{BP}$=0), if a predetermined speed limit is exceeded ($v_{Roll}$>$v_{Gr}$).

2. The method according to claim 1, further comprising the step of engaging a forward starting gear ($G_{Anf}$) that is appropriate for the speed limit regardless of the rolling direction.

3. The method according to claim 1, further comprising the step of detecting a current rolling direction with a sensor means and engaging a starting gear ($G_{Anf}$) that is effective in the current rolling direction and appropriate for the speed limit.

4. The method according to claim 1, further comprising the step of, if the motor vehicle subsequently decelerates, and either the current rolling speed falls below a predetermined minimum rolling speed value ($v_{Roll}$<$v_{min}$) or a speed of the drive engine falls below a predetermined minimum engine speed value ($n_M$<$n_{min}$), re-disengaging the friction clutch ($x_K$=0).

5. The method according to claim 4, further comprising the step of, after the friction clutch is disengaged and no later than when the motor vehicle stops moving, disengaging ($G_i$=N) the engaged starting gear ($G_{Anf}$).

6. The method according to claim 1, further comprising the step of, if the motor vehicle subsequently accelerates and then if either the rolling speed is either greater than or equal to a predetermined maximum speed ($v_{Roll} \geq v_{max}$) or an engine speed is either greater than or equal a predetermined maximum engine speed ($n_M \geq n_{max}$), carrying out an upshift by one gear ($G_i$=$G_{i+1}$).

7. The method according to claim 1, further comprising the step of, if the motor vehicle subsequently accelerates and then if either the rolling speed is either greater than or equal to a predetermined maximum speed ($v_{Roll} \geq v_{max}$) or an engine speed is either greater than or equal a predetermined maximum engine speed ($n_M \geq n_{max}$), automatically actuating a vehicle brake.

8. The method according to claim 7, further comprising the step of regulating braking torque of the vehicle brake such that the rolling speed of the motor vehicle is maintained constant.

9. The method according to claim 7, further comprising the step of regulating braking torque of the vehicle brake such that the rolling speed of the motor vehicle decreases until the vehicle comes to rest.

10. The method according to claim 1, further comprising the step of, when at least one of the shift operation element, the accelerator pedal and the brake pedal are actuated (shift operation element $X_{SBE}>0$, accelerator pedal $x_{FP}>0$, brake pedal $x_{BP}>0$), terminating the safety function and returning the vehicle to one of a normal starting and a driving mode.

11. The method according to claim 10, further comprising the step of, before terminating the safety function at least due to actuation of the shift operation element ($x_{SBE}>0$), disengaging the friction clutch ($x_K=0$).

12. A method for controlling an automated multi-step variable-speed transmission which, within a drivetrain of a motor vehicle, is connected to a drive engine, on an input side, via a hydrodynamic torque converter, and to drive wheels of a driven axle, on an output side via an axle drive, such that when the vehicle is at rest, the drive engine is running and the drivetrain is disengaged, rolling of the motor vehicle is either prevented or at least restricted by a shift operation in the multi-step variable-speed transmission, the method comprising the steps of:

activating a safety function, when the multi-step variable-speed transmission is in a neutral position ($G_i=N$);

detecting actuation of a shift operation element, an accelerator pedal and a brake pedal and a current rolling speed, via sensors; and engaging a starting gear ($G_i=G_{Anf}$) when the shift operation element, the accelerator pedal and the brake pedal are not actuated (shift operation element $X_{SBE}=0$, accelerator pedal $x_{FP}=0$, brake pedal $x_{BP}=0$), if a predetermined speed limit is exceeded ($v_{Roll}>v_{Gr}$).

13. The method according to claim 12, further comprising the step of, if the motor vehicle subsequently decelerates and either the current rolling speed falls below a predetermined minimum rolling speed value ($v_{Roll}<v_{min}$) or a speed of the drive engine falls below a predetermined minimum engine speed value ($n_M<n_{min}$), disengaging the engaged starting gear ($G_i=N$).

* * * * *